US008423493B2

(12) United States Patent
Moerchen et al.

(10) Patent No.: US 8,423,493 B2
(45) Date of Patent: Apr. 16, 2013

(54) CONDITION MONITORING WITH AUTOMATICALLY GENERATED ERROR TEMPLATES FROM LOG MESSAGES AND SENSOR TRENDS BASED ON TIME SEMI-INTERVALS

(75) Inventors: Fabian Moerchen, Rocky Hill, NJ (US); Dmitriy Fradkin, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 475 days.

(21) Appl. No.: 12/756,432

(22) Filed: Apr. 8, 2010

(65) Prior Publication Data

US 2010/0332540 A1     Dec. 30, 2010

Related U.S. Application Data

(60) Provisional application No. 61/221,288, filed on Jun. 29, 2009.

(51) Int. Cl.
*G06F 17/00* (2006.01)
*G06F 7/36* (2006.01)
*G06F 17/30* (2006.01)

(52) U.S. Cl.
USPC ............................................ 706/45; 707/725

(58) Field of Classification Search ...................... 706/45
See application file for complete search history.

(56) References Cited

PUBLICATIONS

Mannila et al. (Mannila), "Discovering frequent episodes in sequences Extended abstract", 1995.*

Allen, "Maintaining Knowledge About Temporal Intervals", Communications of the ACM 26(11): 832-843 (1983).
Freksa, "Temporal Reasoning Based on Semi-Intervals", Artificial Intelligence 54(1): 199-227 (1992).
Roddick et al., "Linear Temporal Sequences and Their Interpretation Using Midpoint Relationships", IEEE Transactions on Knowledge and Data Engineering 17(1): 133-135 (2005).
Hoeppner, "Discovery of Temporal Patterns—Learning Rules About the Qualitative Behaviour of Time Series", Proc. of the 5th European Conf. on Principles of Data Mining and Knowledge Discovery (PKDD), pp. 192-203 (Springer 2001).
Moerchen et al., "Efficient Mining of Understandable Patterns From Multivariate Interval Time Series", Data Min. Knowl. Discov. (2007).
Casas-Garriga, "Summarizing Sequential Data With Closed Partial Orders", Proceedings of the 5th SIAM Int'l Conf. on Data Mining (SDM '05), pp. 380-391 (2005).
Pei et al., "Efficiently Mining Frequent Partial Orders", Proceedings of the 5th IEEE Int'l Conf. on Data Mining (ICDM'05), pp. 753-756 (2005).
Railssi et al., "Mining Conjunctive Sequential Patterns" Data Min. Knowl. Discov., 17(1): 77-93 (2008).

(Continued)

*Primary Examiner* — Jeffrey A Gaffin
*Assistant Examiner* — Nathan Brown, Jr.

(57) ABSTRACT

An approach is provided for condition monitoring from log messages and sensor trends based on time semi-intervals. The approach may be applied to machine condition monitoring. Patterns are mined from symbolic interval data that extends previous approaches by allowing semi-intervals and partially ordered patterns. The semi-interval patterns and semi-interval partial order patterns are less restrictive than patterns using Allen's relations. Combinations and adaptations of efficient algorithms from sequential pattern and itemset mining for discovery of semi-interval patterns are described.

28 Claims, 14 Drawing Sheets

PUBLICATIONS

Lucchese et al., "Fast and Memory Efficient Mining of Frequent
Wang et al., "BIDE: Efficient Mining of Frequent Closed Sequences", Proceedings of the 20th Int'l Conf. on Data Engineering (ICDE'04), 79-90 (2004). Closed Itemsets", IEEE Trans. on Knowledge and Data Engineering 18(1): 21-36 (2006).

Moerchen, "Time Series Knowledge Mining", PhD thesis, Philipps University. Marburg, Germany (2006).

Wu et al., "Mining Nonambiguous Temporal Patterns for Interval-based Events", IEEE TKDE 19(6): 742-758 (2007).

Mannila et al., "Discovery of Frequent Episoded in Event Sequences", Proc. of the 1st Int'l Conf. on Knowledge Discovery and Data Mining (KDD), pp. 210-215 (AAAI Press, 1995).

Pei et al., "Discovering Frequent Closed Partial Orders From Strings", IEEE TKDE, 18(1): 1467-1481, 2006.

Hoeppner et al., "Classification Based on the Trace of Variables Over Time", Proc. Int. Conf. Intelligent Data Engineering and Automated Learning (IDEAL), pp. 739-749.

Papapetrou et al., "Mining frequent arrangements of temporal intervals", Knowledge and Information Systems; An International Journal, Springer-Verlag, vol. 21, No. 2, Feb. 20, 2009, pp. 133-171.

Moerchen et al. "Robust mining of tme intevals with semi-interval parial order patterns", Proceedings of the 10th Siam International Conference on Data Mining, Apr. 29, 2010-May 1, 2010, pp. 315-326.

Penberthy, "Temporal unification and the temporal partial order", Proceedings of the Fourth Conference on Artificial Intelligence Applications, Mar. 14-18, 1988, San Diego, CA, pp. 223-228.

Campos et al., "Temporal Data Mining with Temporal Constraints", Jul. 7, 2007, Artificial Intelligence in Medicine; (Lecture notes in Computer Science), Springer Berlin, Heidelberg, Berlin, pp. 67-76.

Nebel, "Reasoning About Temporal Relations: A Maximal Tractable Subclass of Allen's Interval Algebra", ACM, 2 Penn Plaza, Suite 701, New York, US.

European Search Report dated Nov. 8, 2010.

* cited by examiner

| DATA | INTERVALS | LABELS | SEQUENCES | CLASSES |
|---|---|---|---|---|
| ASL-BU | 18250 | 154 | 441 | 7 |
| ASL-GT | 89247 | 47 | 3493 | 40 |
| AUSLAN2 | 900 | 12 | 200 | 10 |
| BLOCKS | 1207 | 8 | 210 | 8 |
| CONTEXT | 12916 | 54 | 240 | 5 |
| PIONEER | 4883 | 92 | 160 | 3 |
| SKATING | 18953 | 41 | 530 | 6/7 |

CONDITION MONITORING WITH AUTOMATICALLY GENERATED ERROR TEMPLATES FROM LOG MESSAGES AND SENSOR TRENDS BASED ON TIME SEMI-INTERVALS

CROSS REFERENCE TO RELATED APPLICATIONS

This application claims the benefit of U.S. Provisional Application Ser. No. 61/221,288 entitled "Condition Monitoring with Automatically Generated Error Templates from Log Messages and Sensor Trends Based on Time Semi-Intervals," filed on Jun. 29, 2009, the contents of which are hereby incorporated by reference herein in their entirety.

FIELD OF THE INVENTION

The present invention relates generally to the field of data mining, and more particularly, to techniques and systems for mining patterns from symbolic temporal data, including interval data and mixed interval and point data.

BACKGROUND OF THE INVENTION

The goal of condition monitoring is to observe processes and detect in advance potential failures or provide input for improved performance. To that effect, it is important to be able to find patterns indicative of an upcoming failure or a need for intervention. For example, sensor measurements showing sudden significant changes could indicate a failure or need for recalibration. Apart from sensor data many systems also generate a wealth of log messages. If the information from log files and sensors is combined, it may be learned that some sensors were replaced before the change started, and thus there is no reason for concern. Alternatively, it may be found that drastic changes, requiring a technician's visit, are always preceded by the same type of error messages in the logs. Currently, it is the analyst's job to look for such patterns by semi-manually processing trend data, log files, inventory records, etc.

Temporal data mining is aimed at exploiting temporal information in data sources to improve performance of clustering or classification algorithms or find models and patterns that describe the data generating process or local effects, respectively. Many data sources under study in business, health-care and scientific applications are dynamic in nature, making them promising candidates for the application of temporal mining methods. As used herein, the terms "temporal interval data" and "time interval data" are used to refer to data that contains time intervals or, in the case of semi-interval data, contain semi-intervals. Those terms in no way preclude the possibility that the data also contains time point data; i.e., mixed interval and point data is considered interval data for purposes of this discussion.

Deriving patterns over intervals is non trivial. The number of possible binary relations ranges from three relations for time points (before, equals, after) to the 13 interval relations described by James F. Allen, Maintaining Knowledge about Temporal Intervals, Communications of the ACM 26(11): 832-843 (1983) (hereinafter "Allen"), the contents of which is hereby incorporated by reference herein in its entirety. For semi-intervals, 10 core relations were identified by C. Freksa, Temporal Reasoning Based on Semi-Intervals, Artificial Intelligence 54(1): 199-227 (1992) (hereinafter "Freksa"). By adding interval-to-interval mid-point relations, 49 relations are obtained by J. F. Roddick and C. H. Mooney, Linear Temporal Sequences and Their Interpretation Using Midpoint Relationships, IEEE Transactions on Knowledge and Data Engineering 17(1): 133-135 (2005). The contents of each are hereby incorporated by reference herein in their entirety. Pattern mining in interval data has relied almost exclusively on Allen's interval relations.

For the purpose of temporal reasoning, Allen formalized temporal logic on intervals by specifying 13 interval relations and showing their completeness. Any two intervals are related by exactly one of the relations. Those operators are: before, meets, overlaps, starts, during, finishes, the corresponding inverses after, met by, overlapped by, started by, contains, finished by, and equals. The time diagram of FIG. 1a shows examples of Allen's interval relations between the intervals A and B. The first six illustrated relationships can be inverted.

The Allen relations are commonly used beyond temporal reasoning, e.g., for the formulation of temporal patterns, but that can be problematic, in particular for noisy data where the exact interval boundaries are not reliable or meaningful. The relations are not robust to noise because small shifts of time points lead to different relations for similar situations observed. For example, FIG. 1b shows several possible patterns according to Allen that are actually fragments of the same approximate relation "almost equals." Researchers have attempted to remedy this problem by using thresholds, by using fuzzy extensions for temporal reasoning, by using different pattern languages that group some of the relations, or by matching against sub-intervals of observed intervals.

The formation of complex patterns using the binary relations of Allen can be done in different ways. Certain early approaches that used nested combinations of binary relations were shown to be ambiguous. The format described by F. Höeppner, Discovery of Temporal Patterns—Learning Rules about the Qualitative Behaviour of Time Series, In Proc. of the 5th European Conf. on Principles of Data Mining and Knowledge Discovery (PKDD), pages 192-203 (Springer 2001) (hereinafter "Höeppner") (hereby incorporated by reference herein in its entirely), which uses the $$\frac{k(k-1)}{2}$$

pairwise relations of all intervals in a pattern, is concise and has been adopted by several recently proposed efficient algorithms. Equivalent patterns have been represented in recent work as a sequence of 2k interval boundaries and by extending nested binary relations with counter variables, annotating how many intervals of a subpattern interact with an interval joined with a binary relation in different ways. The ambiguity inherent to Allen's relations, however, remains. Interval endpoints are typically allowed to shift within a pattern occurrence significantly without changing the relations, causing many situations in the data that are quite different to be represented with the same pattern.

FIG. 1c shows a timeline wherein three examples of the "overlaps" relation of Allen visually and intuitively represent very different situations. Early algorithms for mining patterns based on Allen's relations were based on the a priori principle of building longer patterns by combining frequent short ones. In one example, the transitivity of the relations was used to reduce the number of candidates generated. More recent algorithms use depth-first search strategies with efficient data structures such as enumeration trees, prefix trees and bitmaps.

Approaches that do not use Allen's relations for interval mining include containment patterns, the UTG with sequence of blocks of almost equal intervals, and the Time Series Knowledge Representation (TSKR) with partial orders of blocks of concurrent subintervals described in F. Moerchen and A. Ultsch, Efficient Mining of Understandable Patterns from Multivariate Interval Time Series, Data Min. Knowl. Discov. (2007) (hereinafter "Moerchen and Ultsch").

All the above use qualitative interval patterns; quantitative interval patterns have also been proposed. Algorithms for time interval mining have been inspired by methods for mining time point data. It has been proposed to mine closed partial orders without repeating symbols using an itemset mining algorithm on the set of partial order graph edges. It has further been proposed to mine closed partial orders (including repeating symbols) from itemset sequences by grouping and merging sequential patterns.

It is important that any method or system for monitoring the condition of a system by monitoring temporal interval data, and for identifying important trends and events based on that data, do so in a way that is unambiguous and robust to noise that may cause interval boundaries or time points to shift. The technique should handle data types typically found in log files, trend data and inventory records; i.e., events associated with time points, time intervals and time semi-intervals.

SUMMARY OF THE INVENTION

The present invention addresses the needs described above by providing a method for identifying patterns in symbolic interval data contained in an interval sequence database $\mathcal{D}$. The method comprises the steps of, in a processor, converting the interval sequence database $\mathcal{D}$ into a semi-interval sequence database $\mathcal{D}'$ comprising a plurality of semi-interval itemsets [I, t], each having a unique timestamp t; and identifying closed semi-interval sequence patterns (SISPs) $S_j$ in $\mathcal{D}'$, wherein the closed SISPs contain at least one interval that does not have both start and end points.

The step of converting the interval sequence database $\mathcal{D}$ into a semi-interval sequence database $\mathcal{D}'$, may further include converting each sequence $I$ of $\mathcal{D}$ to a semi-interval sequence $I'$ by: determining all semi-intervals S in the interval sequence database $\mathcal{D}$ as $S=\{[\sigma^+,s],[\sigma^-,e]|[\sigma,s,e]\in I\}$; determining all unique time stamps T in the sequence database $\mathcal{D}$ as $T=\{s,e|[\sigma,s,e]\in D\}$; and determining the semi-interval sequence I' as $I'=\{[\Sigma,t]|\sigma\in\Sigma\Leftrightarrow[\sigma,t]\in T\}$; wherein $\sigma^+$, $\sigma^-$ represent the start and end of a symbolic interval with symbol σ, s and e are the start and end times of an interval, and Σ is an alphabet containing a set of unique symbols.

Another embodiment of the invention is a computer-usable medium having computer readable instructions stored thereon for execution by a processor to perform a method for identifying patterns in symbolic interval data contained in an interval sequence database $\mathcal{D}$, as described above.

DESCRIPTION OF THE INVENTION

Figure 1A:
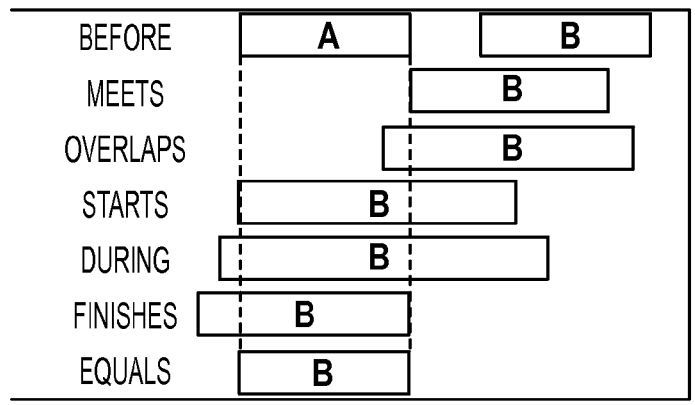
FIG. 1a is a time diagram showing event relationships according to prior art techniques.
Figure 1B:
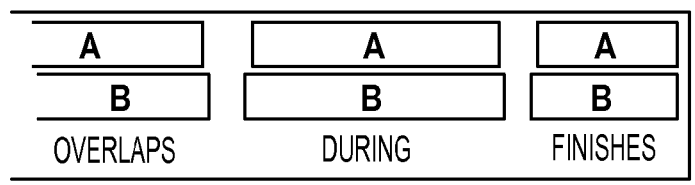
FIG. 1b is a time diagram showing exemplary event relationships.
Figure 1C:
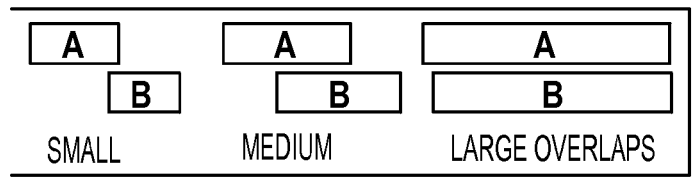
FIG. 1c is another time diagram showing exemplary event relationships.
Figure 2:
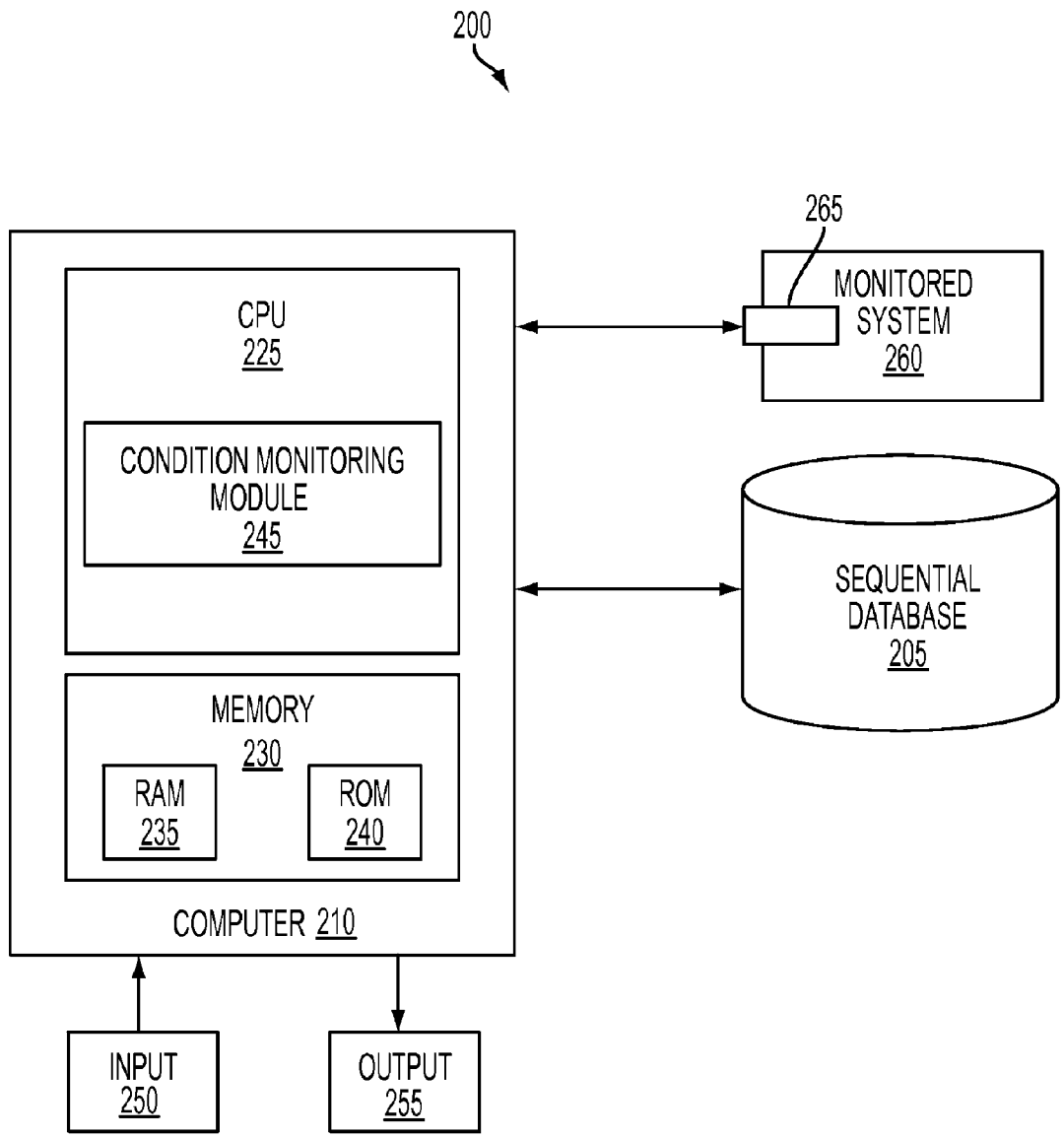
FIG. 2 is schematic illustration of a computer system for executing a method in accordance with the invention.

The present invention may be embodied in a system for filtering sensor values, which may be included in a machine monitoring system or may be a stand-alone system. FIG. 2 illustrates a condition monitoring system 200 according to an exemplary embodiment of the present invention. In the system 200, a computer 210 performs steps of the inventive method. While a single computer 210 is shown, one skilled in the art will recognize that the inventive steps may be performed by a plurality of computers linked by a network or bus.

The computer 210 may be connected to one or more sensors 265 monitoring one or more monitored systems 260. The sensor 265 is arranged to acquire data representing a time-related characteristic of the system 260 or its environment. The data may be stored in a database such as a sequential database 205 wherein data includes timestamps or other temporal identifiers.

The database 205 may alternatively be created in a separate environment from that shown in FIG. 2, and transmitted in real time or in batch form for analysis by the computer 210, or may reside on a disk or in the memory of the computer 210.

The computer 210, which may be a portable or laptop computer or a mainframe or other computer configuration, includes a central processing unit (CPU) 225 and a memory 230 connected to an input device 250 and an output device 255. The CPU 225 includes a condition monitoring module 245 that is configured for performing one or more methods for monitoring conditions and identifying patterns as discussed herein. The CPU may contain other modules such as a signal acquisition module (not shown) that acquires signals for use in compiling data to be stored in the sequential database 205.

The memory 230 includes a random access memory (RAM) 235 and a read-only memory (ROM) 240. The memory 230 may also include a database, disk drive, tape drive, etc., or a combination thereof. The RAM 235 functions as a data memory that stores data used during execution of a program in the CPU 225 and is used as a work area. The ROM 240 functions as a program memory for storing a program executed in the CPU 225. The program may reside on the ROM 240 or on any other computer-usable medium as computer readable instructions stored thereon for execution by the CPU 225 or other processor to perform the methods of the invention. The ROM 240 may also contain data for use by other programs.

The input 250 may be a keyboard, mouse, network interface, etc., and the output 255 may be a liquid crystal display (LCD), cathode ray tube (CRT) display, printer, etc. The computer 210 may be connected to a network, with all commands, input/output and data being passed via the network.

The computer 210 can be configured to operate and display information by using, e.g., the input 250 and output 255 devices to execute certain tasks. Program inputs, such as sequential data, sequential training data, etc., may be input through the input 250, may be stored in memory 230, may be loaded from the sequential database 205, or may be received as live measurements from the sensor 265.

The inventors have discovered an automated approach to generating patterns from data that explain or predict errors. The patterns are based in time semi-intervals and time points and express a complete or partial ordering of such temporal events. The ability to handle partial orders is important due to imprecise time measurement of real world phenomena. Slight differences in time measurements may make two events appear simultaneous, or may reverse their order. For robust analysis it is necessary to efficiently and accurately handle such effects. Partial orders achieve this naturally by allowing some elements in a pattern to occur in any order with respect to each other, while still being constrained with respect to other patterns.

The resulting approach is domain-independent and can be applied to data derived from industry, energy and healthcare. Domain familiarity is only required in converting sensor measurements into symbolic sequences. The presently proposed techniques handle both time points and time intervals in a single framework, in a very general way, by using patterns and partial orders over semi-intervals. Efficient algorithms for mining sequential data can be applied to this new semi-interval representation, revealing the patterns of interest.

Preprocessing

Symbolic sequential data arises directly or can be obtained after preprocessing in a multitude of applications and domains. Examples include financial time series, sensor measurements in condition monitoring applications, entries in log files, customer phone calls and emails and segmented video sequences.

Events in log files and entries in inventory records are easily represented as symbolic sequential data by associating a unique identifier with each type of message or entry, and associating with each instance an appropriate timestamp. For example, if a log file contains an entry of type m at time t, it can be represented as a symbolic time point [m, t].

Numerical data can be converted into symbolic form via discretization and feature extraction. If a rapid growth of value of sensor/variable σ is detected between times $t_1$ and $t_2$, it is possible to create a symbol s="RapidGrowth_σ", and a symbolic time interval [s, $t_1$, $t_2$], indicating that σ was observed from $t_1$ to $t_2$. Similarly, it is possible to create symbols and symbolic intervals for peaks and valleys, as well as periods when the value is above or below some threshold.

Those examples demonstrate that an ability to convert sensor and log data to a uniform format, to process numeric and categorical, point and interval sequential data together to make the most out of available information, is extremely useful.

Semi-Intervals and Partial Orders

In the present disclosure, it is assumed that time can be represented as numerical values. Most programming languages, in fact, support such representation. A time interval is a numeric pair [s, e], where s is the start time and e>s is the end time. Given a symbolic alphabet Σ, where each symbol σ corresponds to a distinct type of event/process, a symbolic time point is a pair [σ, t], indicating that event of type σ occurred at time t. A symbolic time interval is a triple [σ, s, e], where the start time of σ is s, and end time is e. Certain types of data, such as log entries or other "point" events, can be represented as time intervals where s=e.

In the present disclosure, semi-intervals and partial orders are used as a way to achieve more flexible matching of interval patterns. The technique has several novel and attractive features:

- The patterns can include complete intervals or only the starting or the ending time point expressing a mixture of intervals and semi-intervals. By relaxing the constraint that the complete interval must be observed, such patterns can match more similar situations in the data.
- The patterns support a partial order of interval boundaries. In contrast to sequential patterns, partial orders allow some binary relations among elements of the pattern to be unspecified. This is an elegant way of expressing alternatives of Allen's relations between intervals in a pattern.
- By utilizing an interval boundary representation of the data, efficient methods of mining closed and generative partial orders from time point data can be applied. Such methods include those disclosed by G. Casas-Garriga, Summarizing Sequential Data with Closed Partial Orders, In Proceedings of the 5th SIAM International Conference on Data Mining (SDM '05), pages 380-391 (2005) (hereinafter "Casas-Garriga"); J. Pei, J. Liu, H. Wang, K. Wang, P. S. Yu, and J. Wang, Efficiently Mining Frequent Closed Partial Orders, In Proceedings of the 5th IEEE International Conference on Data Mining (ICDM'05), pages 753-756 (2005); C. Railssi, T. Calders, and P. Poncelet, Mining Conjunctive Sequential Patterns, Data MM. Knowl. Discov., 17(1): 77-93 (2008); the contents of each being incorporated by reference in its entirety herein.
- The pattern language can easily incorporate instantaneous events representing patterns that mix intervals, semi-intervals, and time points.

The approach of the present disclosure includes representing intervals as semi-intervals. A symbolic semi-interval is obtained from a symbolic interval as follows: two semi-interval points [σ⁺, s] and [σ⁻, e] are extracted from an interval [σ, s, e]. If two or more semi-intervals have the same time stamp, they are combined in a single itemset [I, t]. Thus, there will be only one semi-interval itemset with timestamp t so they can be ordered by timestamp, resulting in a unique sequence representation. Note that this representation allows easy incorporation of time points, since they are represented in exactly the same way as semi-intervals.

Once that transformation is performed for each interval sequence in some database D, semi-interval sequential pattern (SISP) and semi-interval partial order (SIPO) mining is accomplished by application of well-known sequential data mining algorithms, as described in Moerchen and Ultsch. The following is one exemplary series of steps for processing the transformed data:

1. Find closed SISP S in D using a closed sequential pattern mining algorithm. One example utilizes the algorithm disclosed by J. Wang and J. Han, BIDE: Efficient Mining of Frequent Closed Sequences, In Proceedings of the 20th International Conference on Data Engineering (ICDE'04), 79-90 (2004) (hereinafter "Wang"), the contents of which is hereby incorporated in its entirety herein.

2. Find closed groups of SISP using a closed itemset mining algorithm, such as the DCI_CLOSED algorithm disclosed by C. Lucchese, S. Orlando, and R. Perego, Fast and Memory Efficient Mining of Frequent Closed Itemsets, IEEE Trans. On Knowledge and Data Engineering 18(1): 21-36 (2006) (hereinafter "Lucchese"), the contents of which is hereby incorporated in its entirety herein.

3. Merge each group of SISP into a graph representing a closed SIPO, as disclosed by F. Moerchen, Time Series Knowledge Mining, PhD thesis, Philipps University, Marburg, Germany (2006), the contents of which is hereby incorporated in its entirety herein.

Thus, depending on whether Steps 2-3 are performed, a set of SISPs or SIPOs is obtained for a particular dataset.

Figure 3:
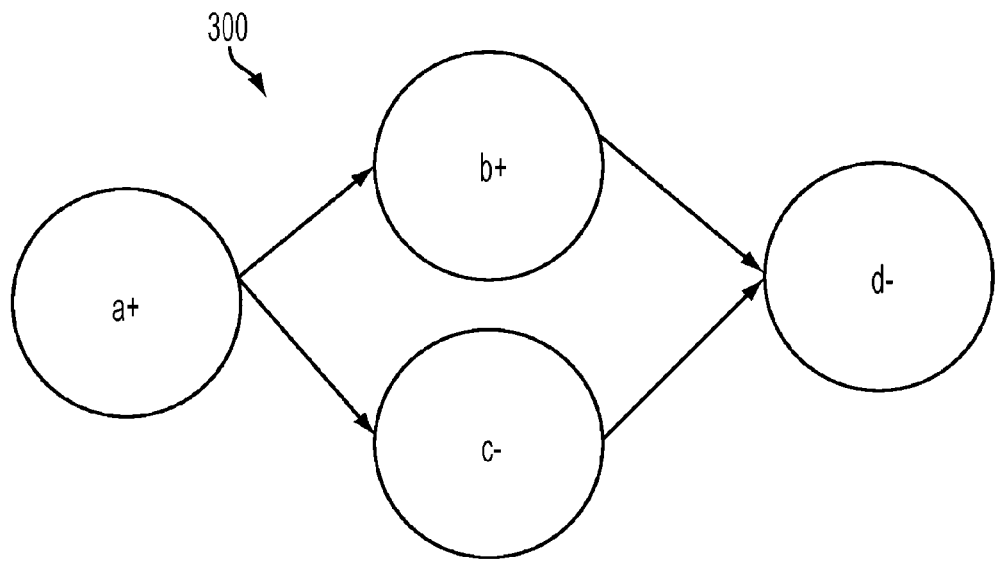
FIG. 3 is a temporal schematic diagram of a semi-interval partial order.

The definitions of SISPs and SIPOs are intuitive: SISP is simply a sequential ordering of itemsets where entries can be events or interval start or end points. SIPO is a partial order over itemsets, meaning that while an order is defined between some itemsets, it is undefined for others, which can occur in any order as long as ordering with respect to other itemsets is not violated. For example, "a⁺b⁺c⁻d⁻" is a SISP, since it specifies a complete order on the set of events. The pattern 300 of FIG. 3 is a SIPO. In that figure, arrows indicate precedence ordering, so a⁺ is before b⁺ and c⁻, each of which is before d⁻. Note that no ordering is specified between b⁺ and c⁻. Since the pattern 300 allows b⁺ to occur before, after or at the same time as c⁻, it is more robust to noise and more powerful, since more situations are covered in that way.

Temporal Data Mining

Aspects of the present disclosure will now be discussed in additional detail. In temporal data mining, input data is usually measured at discrete time points of a certain resolution, representing a sample of the generating time continuous process. Without loss of generality, the following patterns are defined based on the natural numbering T of a set of uniformly spaced time points. First, the data structures that the patterns operate on are defined:

Definition 3.1 Let the alphabet $\Sigma$ be a set of unique symbols.

Definition 3.2 An itemset is a subset $S=\{\sigma_1, \ldots, \sigma_k\} \subseteq \Sigma$ of the alphabet.

Definition 3.3 A time interval is a tuple [s, e] with $[s, e] \in T^2$, s e. The duration of an interval is $d([s, e])=e-s+1$. The finite set of all time intervals is noted $I=\{[s,e]\in T^2 | s \leq e\}$.

Definition 3.4 An order < of intervals is defined as $[s_1, e_1] < [s_2, e_2] \Leftrightarrow s_1 < s_2 \vee (s_1 = s_2 \wedge e_1 \leq e_2)$. It is said that $[s_1, e_1]$ is "before" $[s_2, e_2]$.

Definition 3.5 A symbolic interval is a triple $[\sigma, s, e]$ with $\sigma \in \Sigma$, $[s,e] \in I$. For example, [temperature high, 12, 78] describes a state observed starting at time point 12 and lasting until time point 78, inclusively. If $\{s, \ldots, e\} \cap \{s', \ldots, e'\} \neq 0$, then it is said that the intervals [94, s, e] and [σ', s', e'] overlap.

Definition 3.6 An interval sequence is an ordered sequence of symbolic intervals $I=\{[\sigma_i, s_i, e_i] | \sigma_i \in \Sigma; [s_i, e_i] \in I; i=1, \ldots, N; [s_i, e_i] \leq [s_j, e_j] \forall i \leq j; [s_i, e_i] = [s_j, e_j] \Leftrightarrow \sigma_i \neq \sigma_j \vee i=j\}$.

Definition 3.7 An interval sequence database is a finite set of interval sequences $D=\{I_i | i=1, \ldots, M\}$.

Definition 3.8 Let $\Sigma'=\{\sigma_i^+, \sigma_i^- | i=1, \ldots, k\}$ be the extended alphabet in which each symbol σ from alphabet $\Sigma$ is replaced with $\sigma^+$ and $\sigma^-$ representing the start and end of a symbolic interval with symbol σ.

Definition 3.9 A symbolic semi-interval is a tuple $[\sigma, t]$ with $\sigma \in \Sigma', \in T$.

Definition 3.10 A semi-interval sequence is an ordered sequence of itemsets over an extended alphabet with timestamps $S=\{[S_i, t_i] | S_i \subseteq \Sigma', t_i \forall i < j\}$.

Definition 3.11 A semi-interval sequence database is a finite set of semi-interval sequences $D'=\{S_i | i=1, \ldots, M\}$.

Interval and semi-interval patterns are now defined based on the above definitions of data models.

Definition 3.12 A semi-interval sequential pattern (SISP) is a sequence of itemsets over an extended alphabet $P=\{S_i | S_i \subseteq \Sigma', i=1, \ldots, k\}$. A SISP is contained in a semi-interval sequence $\{[S'_j, t_j]\}$ iff $\exists j_1 < \ldots < j_k$ with $S_i \subseteq S'_{j_i}$ for $i=1, \ldots, k$. The support of a SISP is the number of sequences in a semi-interval sequence database that contain the pattern. A pattern is called frequent if the support is greater than or equal to a given minimum support threshold. A pattern is called closed if it cannot be extended with additional interval boundaries without decreasing the support.

Definition 3.13 A semi-interval partial order pattern (SIPO) is a partial order of itemsets over an extended alphabet represented by an directed acyclic graph with nodes $N=\{S_i | S_i \subseteq \Sigma', i=1, \ldots, k\}$ and edges $\epsilon = \{(i, j) | i \neq j \in 1, \ldots, k\}$. A SIPO is contained in a semi-interval sequence $\{[S'_j, t_j]\}$ iff $\exists j_1, \ldots, j_k$ with $S_i \subseteq S'_{j_i}$ for $i=1, \ldots, k$ and $t_{j_a} < t_{j_b} \Leftrightarrow (a,b) \in \epsilon$. Support and frequent SIPO are analogous to SISP.

Definition 3.14 An Allen pattern is a SISP pattern $\{S_i | i=1, \ldots, k\}$ with the following properties:
$\forall \sigma^+ \in S_i, \exists j \geq i$ with $\sigma^- \in S_j$ and $\sigma^+ \notin S'_{j'}$ for $j'=i+1, \ldots, j$
$\forall \sigma^- \in S_i, \exists j \leq i$ with $\sigma^+ \in S_j$ and $\sigma^+ \notin S'_{j'}$ for $j'=j, \ldots, i-1$;
i.e., every interval is represented with both boundaries and no two intervals with the same symbol overlap.

Definition 3.15 For two intervals $A=[A^+, A^-]$ and $B=[B^+, B^-]$ the relations according to Allen are:

A before $B \Leftrightarrow A^- < B^+$
A overlaps $B \Leftrightarrow A^+ < B^+ \wedge B^+ < A^- \wedge A^- < B^-$
A during $B \Leftrightarrow B^+ < A^+ \wedge A^- < B^-$
A meets $B \Leftrightarrow A^- = B^+$
A starts $B \Leftrightarrow A^+ = B^+ \wedge A^- < B^-$
A finishes $B \Leftrightarrow A^- = B^- \wedge B^+ < A^+$
A equals $B \Leftrightarrow A^+ = B^+ \wedge A^- = B$–and the inverse of the first six analogously.

Comparison

The novel SISP and SIPO patterns are now discussed and compared with existing approaches in interval pattern mining, including the widely used Allen patterns.

The representation of data used in the present disclosure was proposed in S.-Y. Wu and Y.-L. Chen, Mining Nonambiguous Temporal Patterns for Interval-Based Events, IEEE TKDE 19(6): 742-758 (2007) (hereinafter "Wu"). The presently described pattern definition of Allen patterns is different from that described by Wu. In Wu, a pattern is represented as a chain of interval boundaries connected with binary relations (precedes and equals). The presently described definition of Allen patterns, which is based on the semi-interval representation, uses the well known sequential pattern format with itemsets for symbols corresponding to the same timestamp. In addition, it uses closedness to avoid redundancy in the reported patterns.

Similar to Wu, it is easy to show that the Allen patterns defined above are equivalent to the format of Höeppner discussed above, that lists all pairwise interval relations. Consider k intervals with $$\frac{k(k-1)}{2}$$

binary relations according to Allen. Each

Allen relation is defined using one to three binary time point relations (smaller or equal) between interval boundaries (see Definition 3.15). All four relations between the boundaries of the two intervals can be easily derived. There are thus 2k interval boundaries and all pairwise point relations are known. All equal interval boundaries are grouped into sets and the sets are ordered such that all inequality relations are preserved, obtaining an Allen pattern according to Definition 3.14. That is possible because all interval relations were specified. In reverse, given an Allen pattern (Definition 3.14), the relation between any two intervals may be looked up using Definition 3.15.

Figure 4:
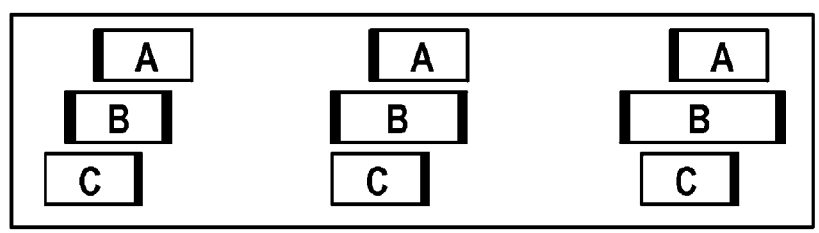
FIG. 4 is a time diagram showing exemplary event relationships.

In contrast to Allen patterns, the SISP and SIPO patterns do not require both endpoints of an interval to be included in a pattern. That allows for more flexible matching of situations where one boundary of an interval has a common relative positioning to other (semi-) intervals but the relation of the other endpoint differs. An example is shown in FIG. 4, wherein three instances of the SIPO pattern $B^+A^+C^-B^-$ are marked with bold interval boundaries. Interval A always starts before C ends and B is observed during this time. The duration of B varies among the three examples, causing the relations according to Allen between B and the other intervals to differ. Considering only the start point of A and the end point of C, the SIPO pattern $B^+A^+C^-B^-$ can match all three examples. These same three situations are difficult to capture with a single pattern using thresholds on Allen's relations. Starting with the center example, the relations would be A finishes B, B starts C, and C overlaps A. Considering close-by interval boundaries as equals, the same could be said for the right example. On the left, however, there is a problem with modified relations based on thresholds. The distance between the start points of C and B is about the same as the distance between the start points of A and B. A threshold large enough to obtain B starts C would change the relation between A and B to equals (the threshold would consider both the start and end points of A and B close enough to be equal). This example highlights another problem with thresholds: in patterns with more than two intervals, thresholds can lead to inconsistencies. From B starts C and A equals B we would expect to be able to deduct A starts C using the transitivity rules of Allen's relations but the difference between the start points of A and C may be up to 2σ. Using the TSKR described in Moerchen and Ultsch, all three examples could be matched by the pattern BC, ABC, AB but a minimum duration threshold on the coincidence of intervals must be chosen.

Furthermore, SIPO patterns can represent a partial ordering of interval endpoints. For time point data this concept has been proposed with episodes (H. Mannila, H. Toivonen, and I. Verkamo, Discovery of Frequent Episodes in Event Sequences, In Proc. of the 1st Inti. Conf. on Knowledge Discovery and Data Mining (KDD), pages 210-215 (AAAI Press, 1995)) and partial order pattern (J. Pei, H. Wang, J. Liu, K. Wang, J. Wang, and P. S. Yu, Discovering Frequent Closed Partial Orders from Strings, IEEE TKDE, 18(11): 1467-1481 (2006)). The concept has not been directly used for interval data. Consider the pairwise relation matrix of Höeppner that specified a complete ordering of intervals. The matrix representation was extended in F. Höeppner and A. Topp, Classification Based on the Trace of Variables over Time, In Proc. Int. Conf. Intelligent Data Engineering and Automated Learning (IDEAL), pages 739-749 (Springer 2007) (hereinafter "Höeppner and Topp") by allowing negation and sets of relations. To reduce the complexity of the search space, only specific groups of similar relation (e.g. before and meets) are allowed. The relation between two intervals is thus not always completely specified—a weak form of partial order.

A generalization of this would be to allow blanks in the matrix, to obtain a partial ordering of intervals according to Allen's binary relations. For each blank the transitivity rules of Allen's relations could be used to narrow down or even fill in some of the blanks. This corresponds to the automated reasoning task the relations were designed for in the first place. If at least two intervals remain where the exact relation is unknown, such a pattern would represent a partial order that cannot be represented with a single Allen pattern. Using the presently-described semi-interval representation, that exercise is much easier, because no reasoning is required. That corresponds to Freksa's observation that "in no case, more than two relations between beginnings and endings of events must be known for uniquely identifying the relation between the corresponding events."

In summary, it is concluded that SISP and SIPO are very elegant approaches to make interval patterns more flexible. Allowing interval boundaries to be missing from the patterns enables an algorithm to discover situations in the data that cannot be represented by Allen patterns. In addition, SIPO require only a partial ordering of interval boundaries. Depending on the point-to-point relations of the interval boundaries, two intervals can be completely unrelated, partially related via Freksa's semi-interval relations, or fully related via Allen's relations.

Methods

Figure 5:
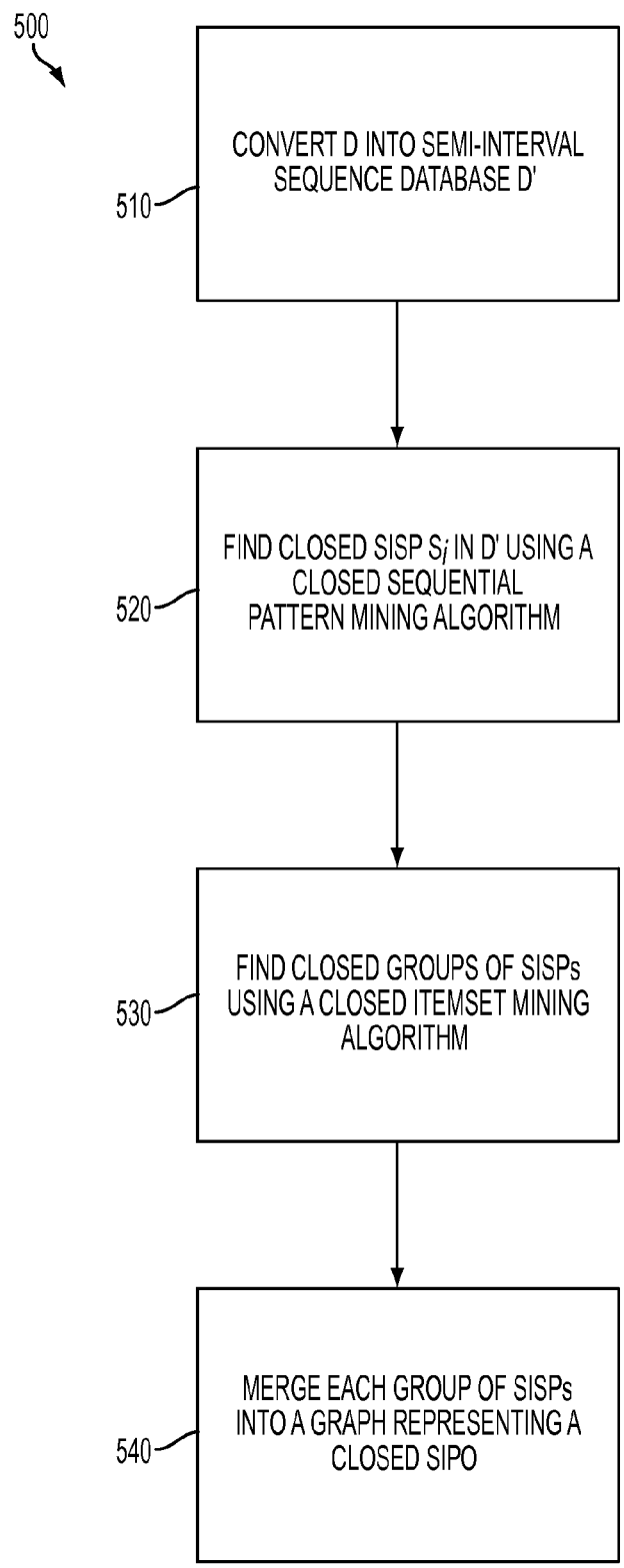
FIG. 5 is a flow chart illustrating a method according to one embodiment of the invention.

A method 500 showing the main steps to mine SISP and SIPO from an interval sequence database $\mathcal{D}$ according to one embodiment of the invention is shown in FIG. 5. Those steps will be described in detail in this section, referring to existing algorithms where a sub-problem is equivalent to a well known data mining problem.

The method uses as a starting point an interval sequence database $\mathcal{D}$ and minimum support $\sigma \in \mathbb{N}$. In the initial step 510, the interval sequence database $\mathcal{D}$ is converted into semi-interval sequence database $\mathcal{D}'$ by converting each sequence I as follows:

Let $S=\{[\sigma^+, s], [\sigma^-, e]|[\sigma, s, e]\in I\}$ be all semi-intervals in the interval sequence.

Let $T=\{s,e|[\sigma,s,e]\in D\}$ be all unique time stamps in the sequence.

Let $I'=\{[\Sigma,t]|\sigma\in\Sigma\Leftrightarrow[\sigma,t]\in T\}$ be the semi-interval sequence.

In step 520, a closed sequential pattern mining algorithm, such as the BIDE algorithm disclosed by Wang, is used to find all closed SISPs with support greater than or equal to σ. For each SISP, the list of sequences where it occurs should be recorded to support the next mining step.

In step 530, a closed itemset mining algorithm, such as the DCLClosed algorithm taught by Lucchese, is used to find closed groups of SISPs that occur in exactly the same sets of sequences in $\mathcal{D}'$ with support greater than or equal to σ. Each SISP $S_i$ is interpreted as an item and each sequence in $\mathcal{D}'$ as an itemset represented by the $S_i$ it contains.

Finally, in step 540, a partial order over semi-intervals (SIPO) is constructed from each set of SISPs. The construction is based on treating each sequential pattern as a graph, where sets in a sequence are nodes and consecutive nodes are connected with edges. Then the path preserving property discussed in Casas-Garriga is used to find matching positions among individual sequences $S_j$ and to merge them. For purposes of completeness, the following method, disclosed in Moerchen and Ultsch, is described for constructing a SIPO from a set of SISPs after setting forth some additional definitions.

Definition 3.16 A SISP $s=\{I_i:1\leq i\leq N\}$ is a subsequence of a SISP $S'=\{I'_j:1\leq i\leq M\}$ represented as $S\in S'$, if $N\leq M$ and $\exists 1\leq k_1<\ldots<k_N\leq M$ such that $\forall 1\leq i\leq N: I_i \subset I'_{k_i}$ Definition 3.17 Head(S, i) of SISP $S=\{I_j:1\leq j\leq N\}$ is a SISP $S'=\{I_j:1\leq j\leq i\}$.

Definition 3.18 Tail(S, i) of SISP $S=\{I_j:1\leq j\leq N\}$ is a SISP $S'=\{I_j:i\leq j\leq N\}$.

Definition 3.19 Let $S \diamond S'$ of SISPs $S=\{I_j:1\leq j\leq N\}$ and $S'=\{I'_j:1\leq j\leq M\}$ denote concatenation, resulting in a SISP $T=\{J_j:1\leq j\leq N+M\}$, where $J_j=I_j$ for $j\leq N$ and $J_j=I'_{j-N}$ for $j>N$.

Definition 3.20 Given a set of N SISPs D, let $I_{ij}$ denote a j-th itemset in SISP $S_i$. A pair of positions $\{ij\}$ and $\{xy\}$ are path preserving iff:

$I_{ji}=I_{xy}$

A SISP head($S_i$, j) $\Diamond$ tail($S_x$, y+1) is a subsequence of some $S' \in D$ A SISP head($S_x$, y) $\Diamond$ tail($S_i$, j+1) is a subsequence of some $S' \in D$ The steps for constructing SIPO from a set of SISPs are shown in sequence. To start, the algorithm requires a set of N SISPs $S_i$, $1 \leq i \leq N; S_i \notin S_j, \forall 1 \leq i,j \leq N$. A pseudocode representation of the algorithm is as follows:

```
 1: Create an empty graph, G
 2: {Create all vertices}
 3: for each position I_ij , i = 1, ..., N, j = 1, ... , |S_i| do
 4:       V_ij = null
 5: end for
 6: Set v = 0
 7: for each position I_ij , i = 1, ..., N, j = 1, ..., |S_i| do
 8:       if V_ij is null then
 9:          Create a new vertex V, with id v and set its contents to I_ij
10:          Add V to G
11:          v ++
12:          V_ij = V
13:          for each position I_kl, k = i + 1, ..., N, l = 1, ..., |S_k| do
14:             if V_kl is null and positions {ij} and {kl} are path
                preserving
                then
15:                V_kl = V_ij
16:                break
17:             end if
18:          end for
19:       end if
20: end for
21: {Create all edges}
22: for each position I_ij , i = 1, ..., N, j = 2, ... , |S_i| do
23:       if edge (V_i(j-1), V_ij) is not in G then
24:          Add (V_i(j-1), V_ij) to G
25:       end if
26: end for
27: return Graph G, representing SIPO
```

Applications

As mentioned previously, SISPs and SIPOs can be extracted, possibly after some pre-processing, for different kinds of data. One application is monitoring performance of medical diagnostic machines, such as Molecular Imaging (MI) machines, installed in multiple locations all over the world. One important workflow in monitoring MI machine performance involves the analysis of log files on machines when problems are detected by an analyst or reported by a customer. Another is analysis of sensor measurements and calibrations recorded by a separate system. Sensor measurements can be converted to interval and point data in many ways, including:

A point event can be created when a machine is shut down, or when a part is replaced (this can frequently be determined from sensor data due to sudden change in the range of some sensors).

An event can be created if a particular measurement crosses some threshold.

An interval can be created for a period when a sensor is above some threshold, or when a sensor value is increasing or decreasing or is stable.

Clearly, familiarity with the domain is needed in order to perform this conversion intelligently, otherwise too many unnecessary events and intervals will be created, reducing efficiency and performance. Once the conversion has been done, and the sensor data is combined with data from the logs, the presently described techniques would be able to automate a significant part of analysis.

Several situations of interest to the analyst have been identified. In one scenario, a problem is reported on one or more machines, and the task of the analyst is to investigate potential causes of the problem and the ways in which such a problem can be detected in advance in the future. In this case the mining algorithms can learn to distinguish these situations from the rest of the data, assuming mostly normal behavior. In another scenario, the task is to distinguish occurrences of a known event that should be escalated from one that should be ignored. The labels for those categories can be provided by the analyst using the interface described.

Figures 6, 7:
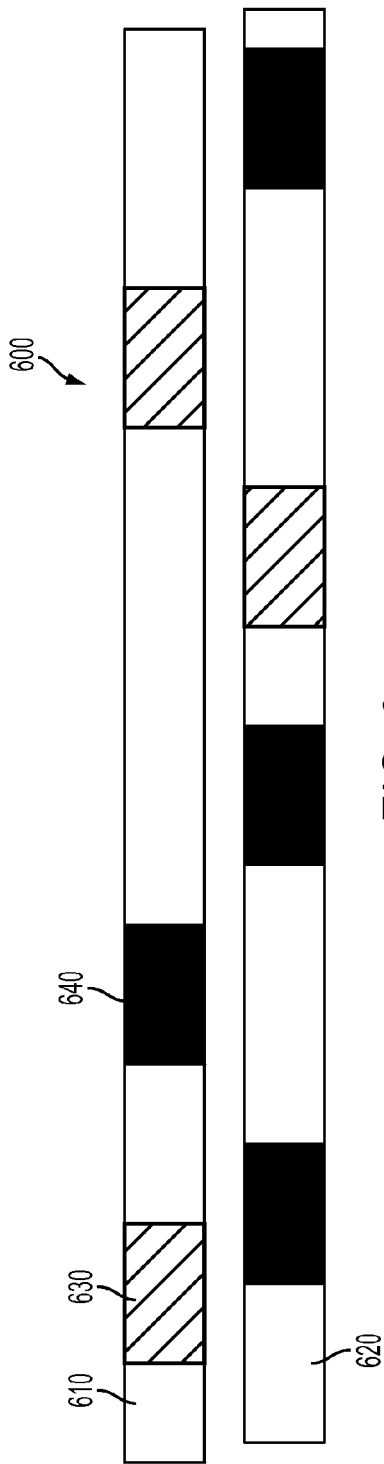
FIG. 6 is a timeline diagram illustrating error escalation.
FIG. 7 is a table showing the temporal datasets used in evaluating the described technique.
Figure 8A:
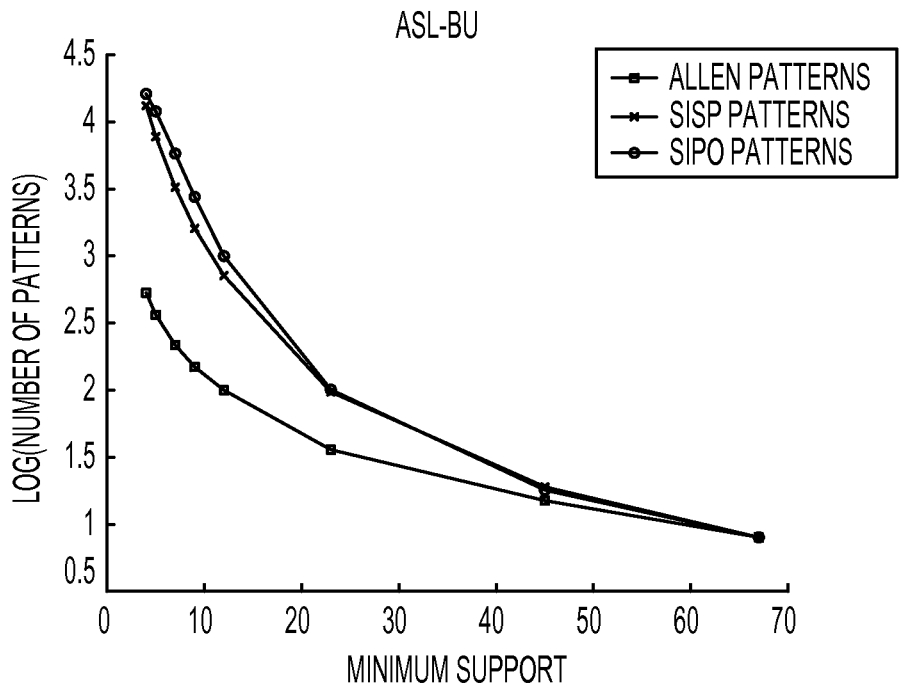
FIGS. 8(a)-8(g) show graphs for comparing numbers of patterns found in the same datasets.
Figure 8B:
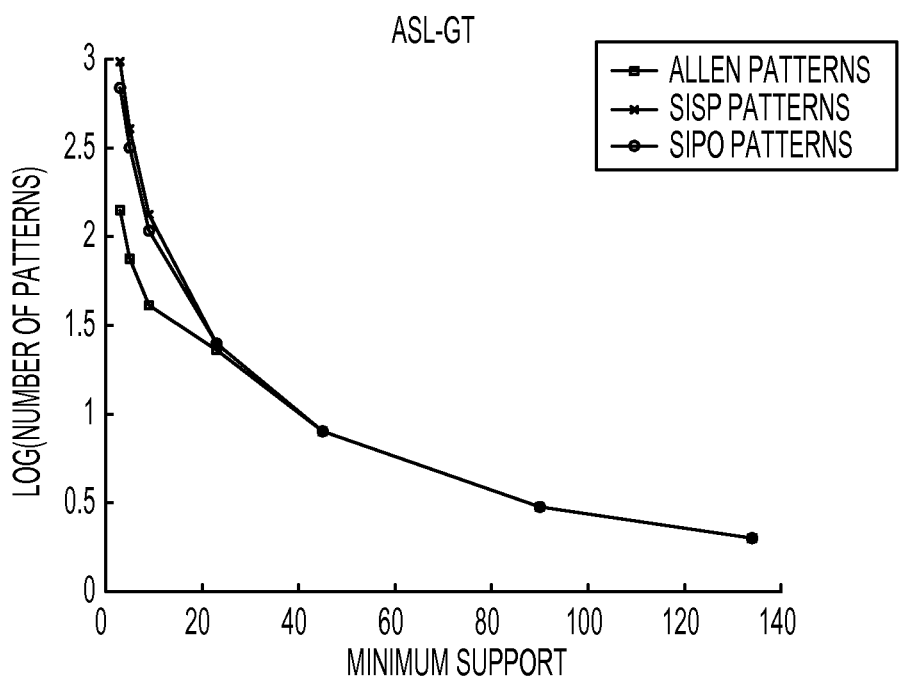
Figure 8C:
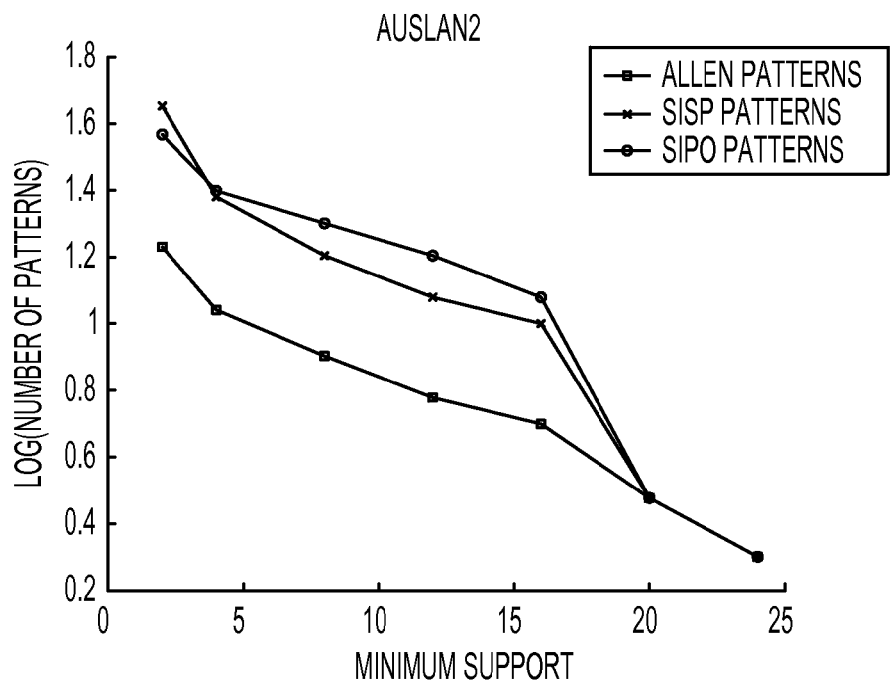
Figure 8D:
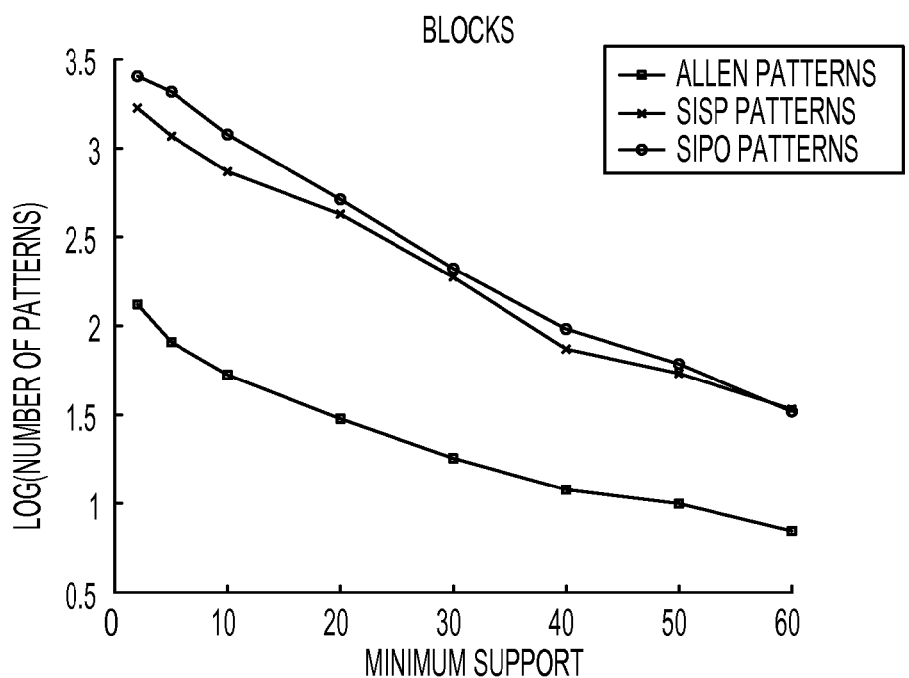
Figure 8E:
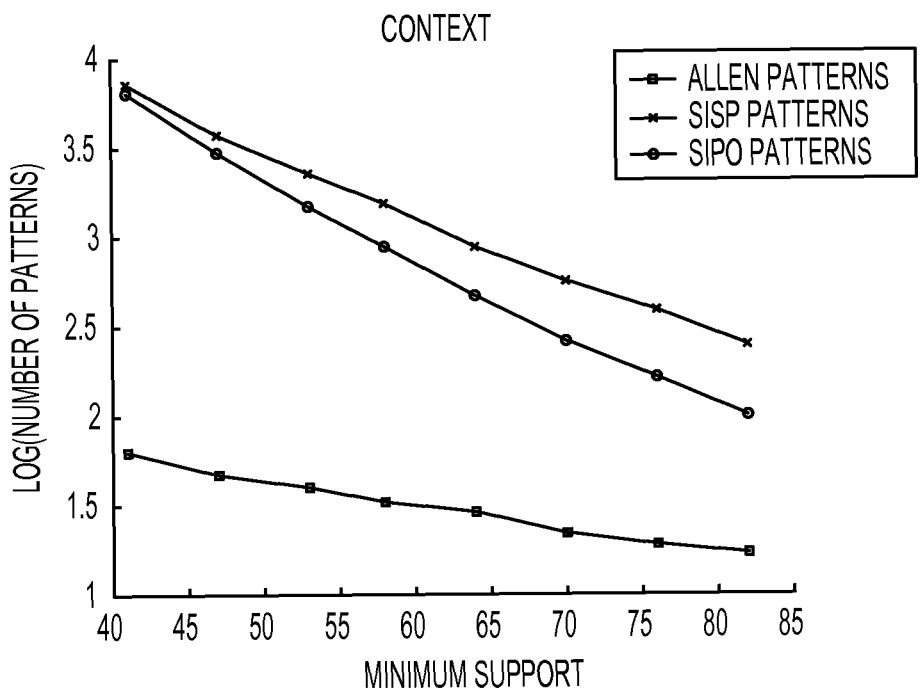
Figure 8F:
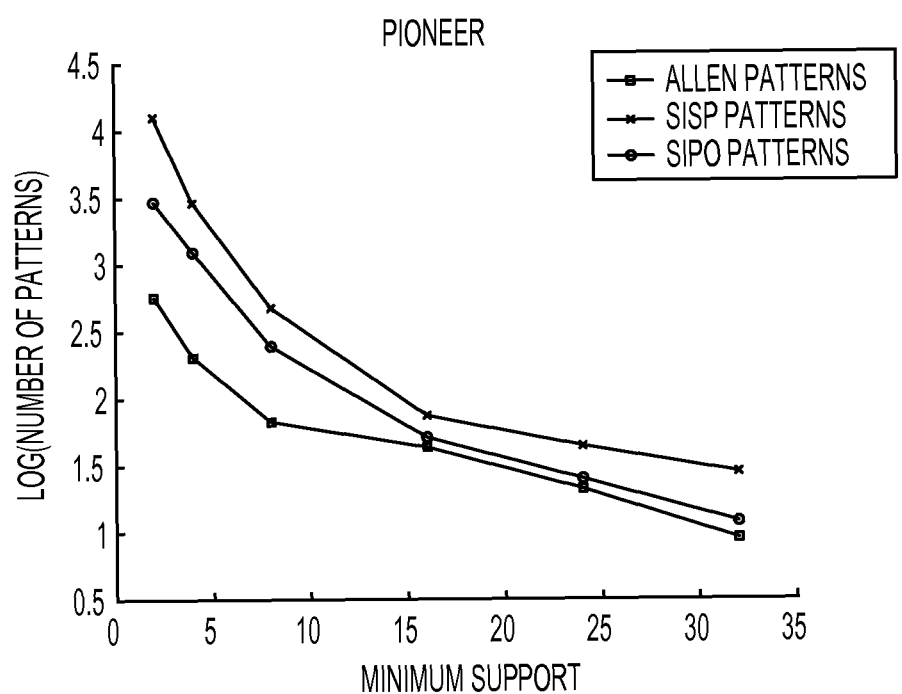
Figure 8G:
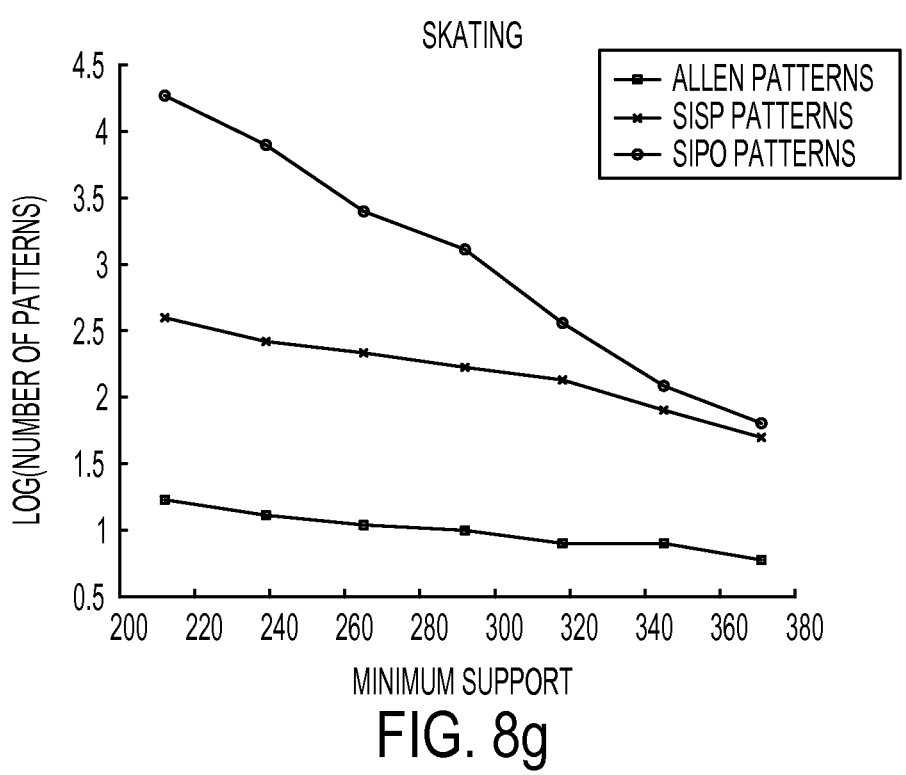

FIG. 6 shows an example where occurrences have been labeled with solid and cross-hatched markings indicating desired escalation strategy. The user searches for a specific event in two log files 610, 620 (long bars). Windows (i.e., subsequences of the log files) of a given length prior to the searched event are displayed as short bars. The user may then label specific occurrences for error escalation 640 (solid) or not 630 (cross-hatched), based on their experience or results of some empirical investigation into system behavior, and initiate an automated statistical analysis of events in the windows. One example of analysis would include generating SISPs separately for the two types of windows (before escalation; and before event that does not need to be escalated) and looking for SISPs that are predictive of a type; i.e., occurring in one type but not in the other. Such SISPs may need to be validated by the user, or by their performance on some hold-out examples.

In each of these situations, the solution would involve:

1. For each class of cases, finding frequent event sequences (patterns).

2. Computing quality of each pattern as a predictor of the classes.

3. Reporting the best predictors, with their scores, to the analyst.

Both of the above scenarios relate to the task of predicting problems. Another task that might be of interest is exploratory. By looking over all logs and all machines, an analyst might be able to find common sequences indicating regular usage of the system. This, in turn, could be used to identify inefficiencies in how the machines are used or in how the system is structured. Finding such common sequences can be achieved with the same methods used for finding frequent patterns for a particular class or a problem.

Thus, an analyst would be greatly aided by an approach that could automatically perform the following tasks:

Generation of discriminative patterns based on a labeling of occurrences by the expert; i.e., patterns that are over- or under-represented in situations that should (not) be propagated.

Generation of predictive patterns; i.e., patterns that are over-represented before an event of interest (without the need of an expert to distinguish situations).

Association of scores to patterns indicating the confidence that the error should be propagated or the likelihood that a certain target event is expected to be observed within a certain time period.

The quality of analysis would be further improved once log file data is combined with sensor measurement data. Combining information from those two sources can provide additional insight into the system behavior, and will produce new informative patterns.

The SIPO and SISP patterns used in the present invention are more flexible and powerful patterns than those used previously. In experiments on public datasets they have also been shown to be more predictive of sequence classes, and thus they stand to be more useful for practical problems.

Experiments

Experiments were performed on real life data sets, comparing semi-interval patterns (SISP and SIPO) with Allen patterns. The number of patterns found and the predictiveness of the patterns with respect to the known sequence classes were analyzed, and it was observed that:

Significantly more semi-interval patterns are found given the same minimum support threshold. This demonstrates that actual semi-interval patterns that ignore some interval boundaries are found in real life data.

The larger pool of semi-interval patterns contains patterns that are more predictive for the known classification of interval sequences than the best interval patterns.

Data

Temporal patterns were evaluated using the seven datasets with interval data summarized in table 700 shown in FIG. 7. The seven databases included many sequences of labeled intervals with class labels for each sequence. To the best of the inventors' knowledge this is largest set of real life interval data used in pattern mining research yet. The origin and preprocessing steps of the data are described below:

ASL-BUI: The intervals are transcriptions from videos of American Sign Language expressions provided by Boston University. It includes observation interval sequences with labels such as head mvmt: nod rapid or shoulders forward that belong to one of seven classes like yes-no question or rhetorical question.

ASL-GT: The intervals are derived from 16 dimensional numerical time series with features derived from videos of American Sign Language expressions. The numerical time series were discretized into 2-4 states. Each sequence represents one of 40 words like brown or fish.

Auslan2: The intervals were derived from the high quality Australian Sign Language dataset in the UCI repository donated by Kadous. The x,y,z dimensions were discretized using Persist with 4 bins, 5 dimensions representing the fingers were discretized into 2 bins using the median as the divider. Each sequence represents a word like girl or right.

Blocks: The intervals describe visual primitives obtained from videos of a human hand stacking colored blocks. The interval labels describe which blocks touch and the actions of the hand (contacts blue red, attached hand red). Each sequence represents one of 8 different scenarios from atomic actions (pick-up) to complete scenarios (assemble).

Context: The intervals were derived from categoric and numeric data describing the context of a mobile device carried by humans in different situations. Numeric sensors were discretized using 2-3 bins chosen manually based on exploratory data analysis. Each sequence represents one of five scenarios such as street or meeting.

Pioneer: The intervals were derived from the Pioneer-1 datasets in the UCI repository. The numerical time series were discretized into 2-4 bins by choosing thresholds manually based on exploratory data analysis. Each sequence describes one of three scenarios: gripper, move, turn.

Skating: The intervals were derived from 14 dimensional numerical time series describing muscle activity and leg position of 6 professional in-line speed skaters during controlled tests at 7 different speeds on a treadmill. The time series were discretized into 2-3 bins using Persist and manually chosen thresholds. Each sequence represents a complete movement cycle and is labeled by skater or speed.

Numerosity

By definition, the number of SISPs is always greater than or equal to that of Allen patterns. The graphs of FIG. 8(*a*)-(g) show the number of patterns found by the different methods using different support thresholds. For almost all datasets and minimum support values, the number of SISPs is much larger than the number of Allen patterns. Only for large minimum support values on ASL-BV and Auslan2 and most minimum support values on ASL-GT the numbers are very close, indicating absence of significant semi-interval patterns that do not include complete intervals. The numbers of SISPs and SIPOs are often comparable. Either one can be larger. Several SISPs could be grouped into a SIPO without loss of frequency reducing the number of patterns. However, when many SIPOs (which are conjunctive combinations of SISPs) have lower frequencies more patterns are observed. The results show that plenty of non-degenerate examples of both newly proposed patterns are found in real-life data.

Predictiveness

Patterns obtained by unsupervised mining can be used for knowledge discovery by ranking and analyzing them directly, for generation of temporal association rules, or as features in predictive models. The inventors analyzed the predictiveness of the patterns by evaluating precision and recall for the available classifications for the interval sequences. Full predictive models are beyond the scope of this disclosure, since they would require classifier learning, validation and parameter tuning. The usefulness of the patterns was simply evaluated for ranking or predictive learning. Since SIPOs had very similar frequencies to SISPs, only results for the latter are listed. For each class and each Allen and SISP pattern $\mathcal{P}_i$, a precision $p_i$, recall $r_i$, and F1 were calculated. For each class, the precision/recall plot was analyzed and the Pareto set of patterns, i.e., all patterns that are not dominated by another pattern in both dimensions, was determined. Assuming the $(p_i, r_i)$ of the Pareto set are sorted increasing by precision and decreasing by recall, a curve is drawn through the points (0, $r_1$), $(p_i, r_i)$, $(p_i, r_i+1)$, $(p_i+1, r_i+1)$, . . . , $(p_k, r_k)$, $(p_k, 0)$ for i=1, . . . , k. The area under the curve (AVC) was calculated to summarize the predictive power of the Pareto set of patterns. The best F1 values for each pattern class and the AUC were compared between Allen and SISP patterns.

Figure 9:
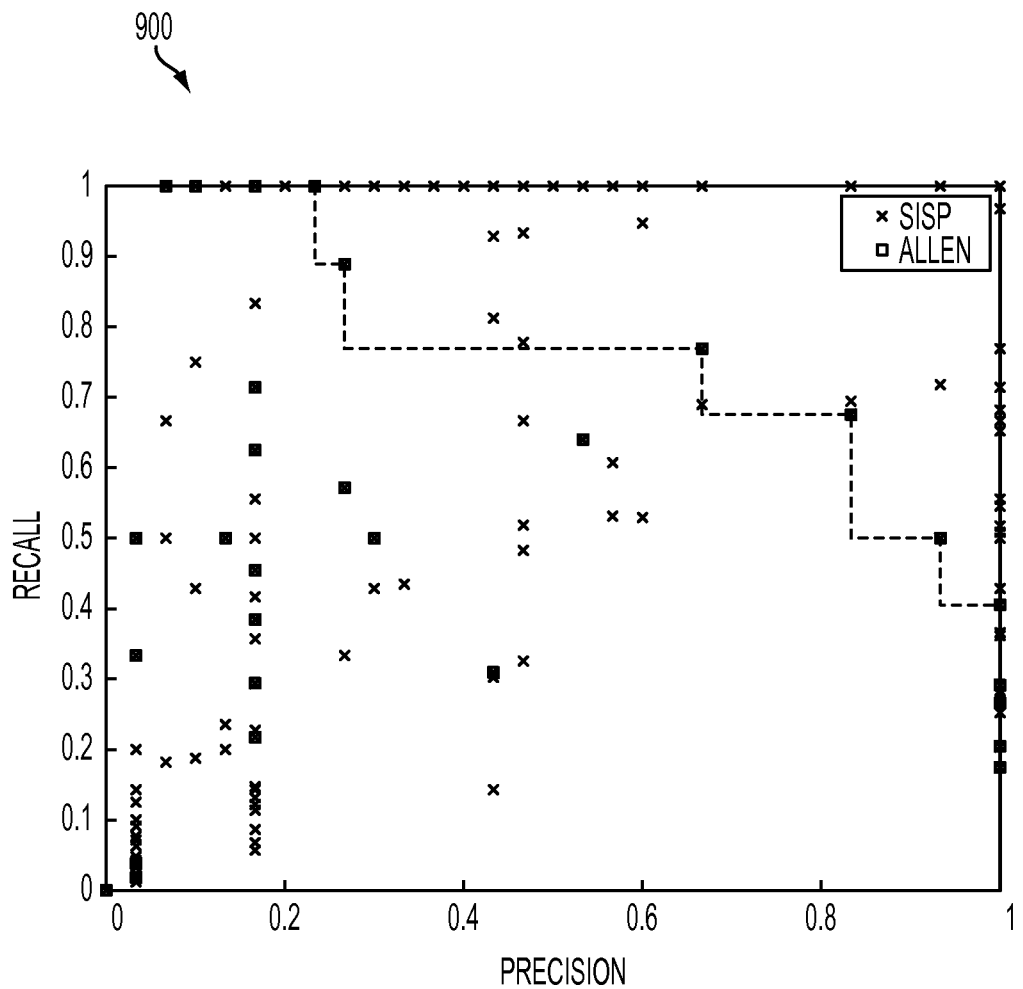
FIG. 9 is a graph showing precision versus recall for the Blocks dataset.
Figure 10A:
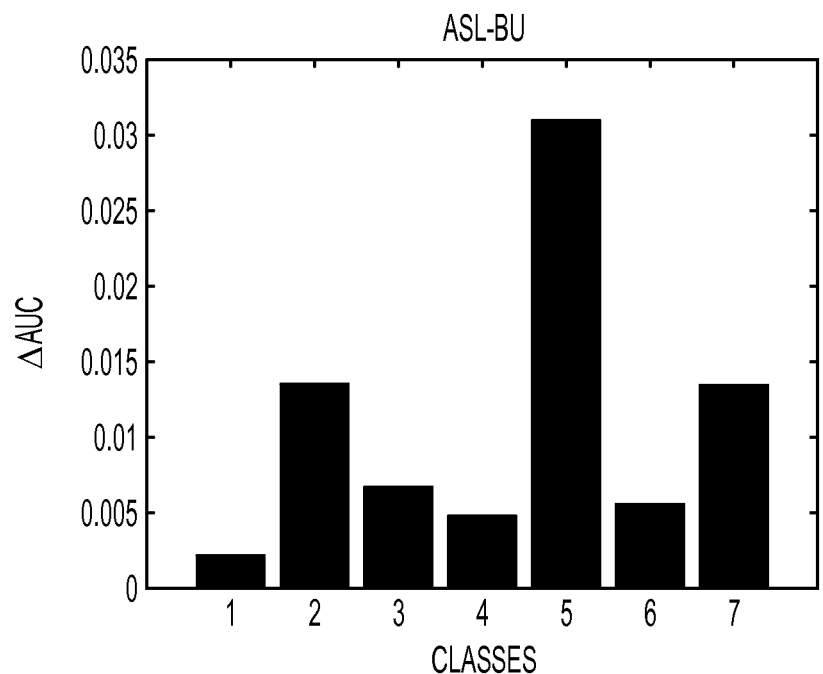
FIGS. 10(a)-10(h) are graphs for comparing patterns found using SISP and Allen models.
Figure 10B:
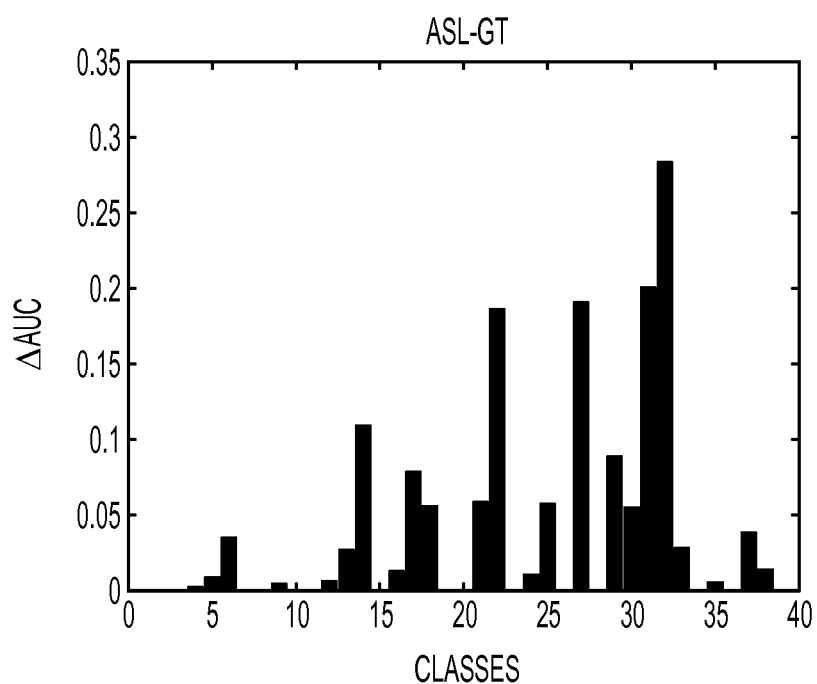
Figure 10C:
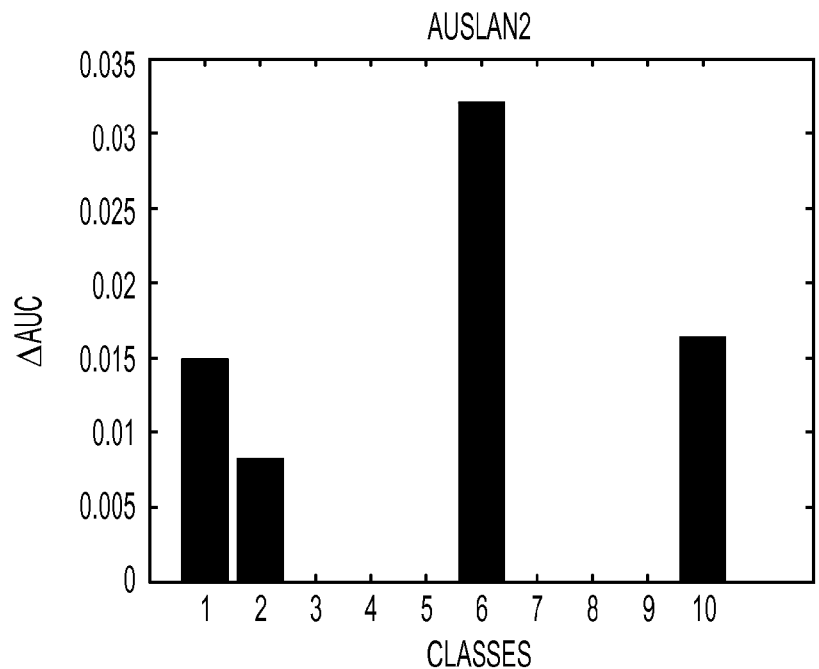
Figure 10D:
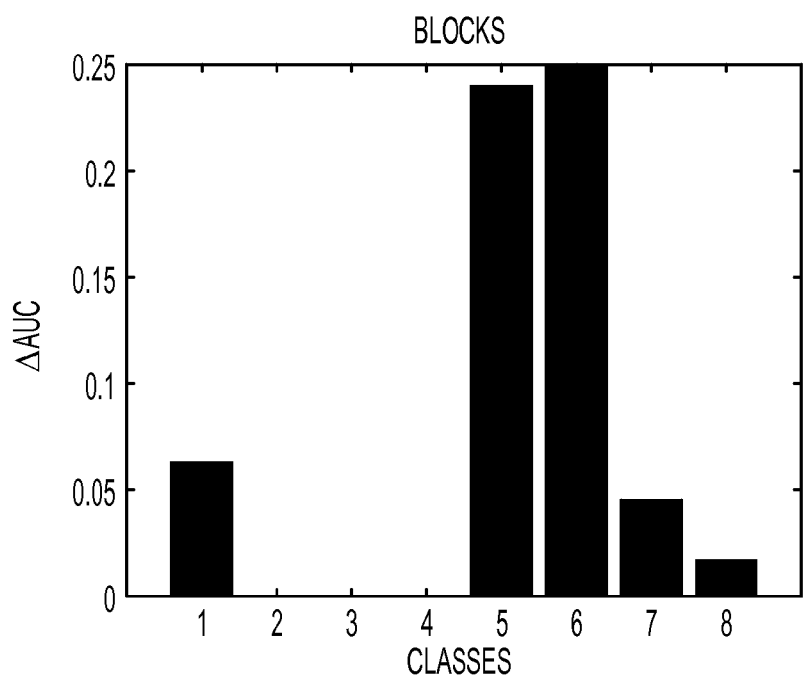
Figure 10E:
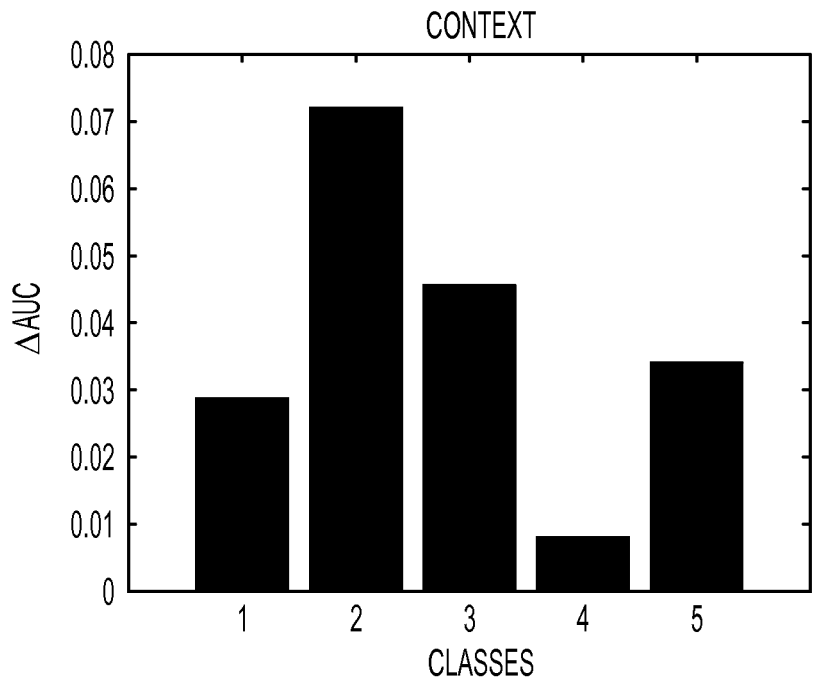
Figure 10F:
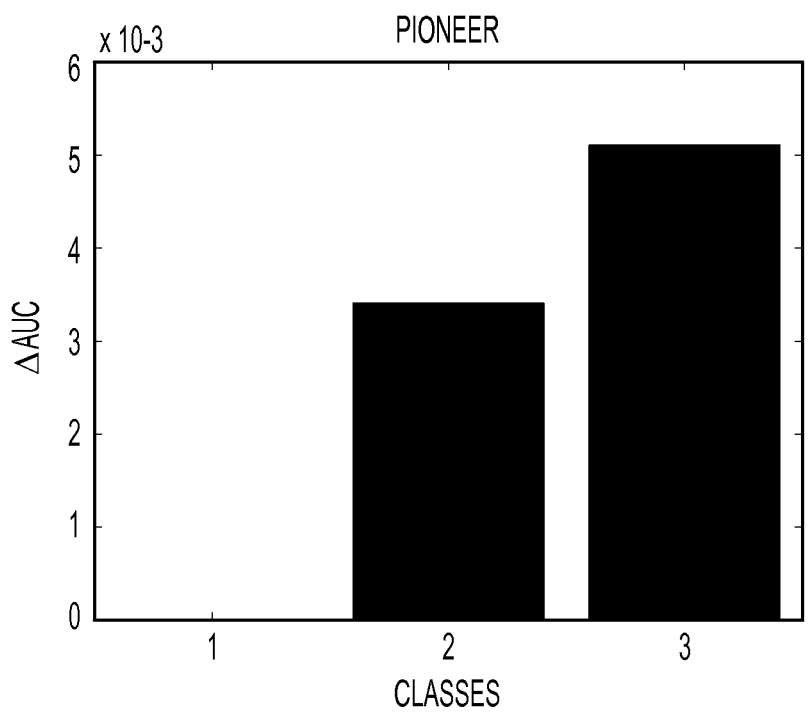
Figure 10G:
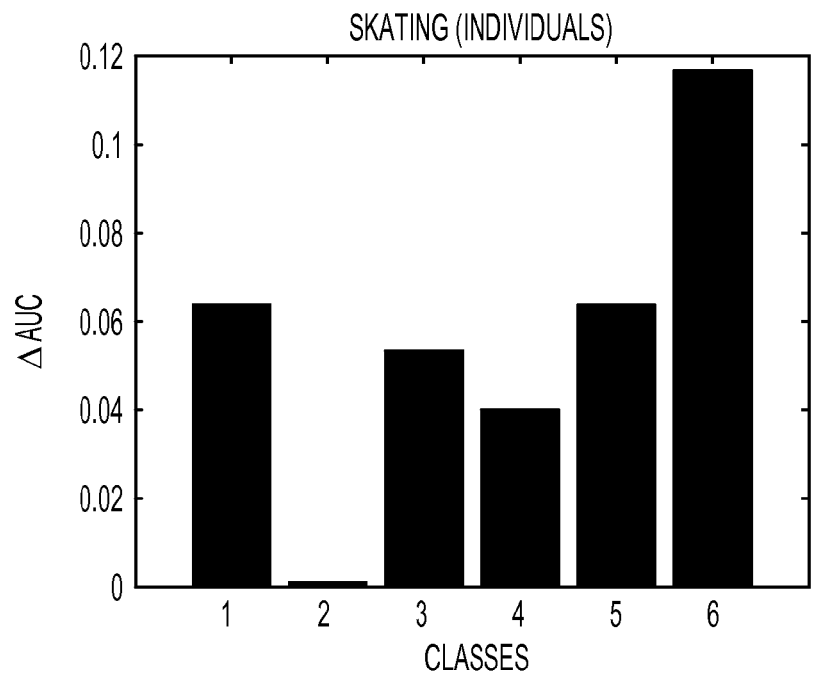
Figure 10H:
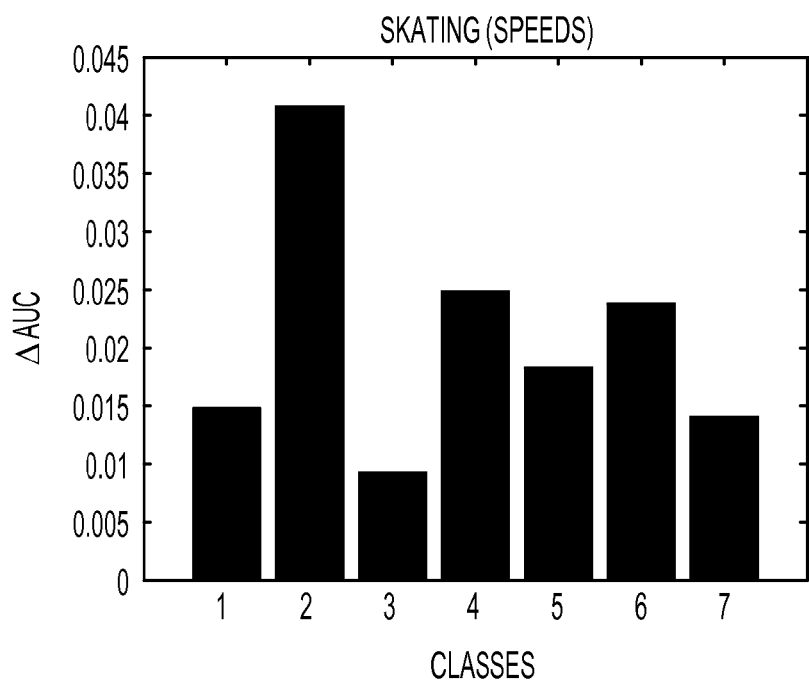

The graph 900 of FIG. 9 shows an example graph of precision vs. recall for the stack class of the Blocks dataset. The continuous and dotted lines indicate the Pareto sets for SISP and Allen patterns, respectively. All boxes for Allen patterns coincide with a cross for SISP because SISPs are a superset of Allen patterns. There are plenty of SISP that are better in precision and/or recall than Allen patterns. This can be summarized by comparing the best patterns described by the Pareto sets for Allen (dotted line) and SISP (continuous line).

The graphs of FIG. 10(*a*)-(h) show the difference in AUC between SISPs and Allen patterns for each of the datasets and classes. For most datasets there are many more SISP and SIPO than Allen patterns.

SISPs are always better or equal in predictive power to Allen patterns and show large improvements in many cases such as ASL-GT, Blocks and Skating. The smallest absolute improvements are observed on Pioneer. A comparison of difference in F1 of the best patterns showed similar results. The results demonstrate that SISPs can uncover relationships among semi-intervals in the data that correlate better with known classes than patterns limited to complete intervals. For the Skating dataset, two classifications were available: by individual skater and by speed. The best F1 values for SISPs were between 0.39 and 0.53 for the six skaters. For the seven different speeds the F1 values ranged much lower from 0.25 to 0.37. This indicates that regularities found in the movement cycles of the skaters are stronger for individuals than for speeds. This is evidence that personal style persists over different speeds. The patterns from better performing skaters can be analyzed for clues regarding their techniques.

Discussion

The present disclosure presents an approach to mining of semi-interval patterns from interval databases. The less restrictive nature of SISP and SIPO helps fight pattern fragmentation caused by small shifts in interval boundaries, that leads to similar situations being represented by different (possibly infrequent) Allen patterns.

The present approach easily generalizes to datasets with mixed time interval and time point data. This was not investigated using the discussed datasets because the datasets included only intervals. When converting numerical data, peaks or valleys could be converted to instantaneous events. The pattern representation has further shown promising results for use in predictive models.

CONCLUSION

A new approach has been described for generating patterns from time point data (such as log messages or peaks in sensor data) and time interval data (such as persistent states detected in sensor trends) for condition monitoring. The pattern language has several significant differences from existing approaches for interval patterns based on Allen's relations, including: (i) interval boundaries are allowed to be missing from a pattern; and (ii) in SIPO a partial ordering of interval boundaries can be modeled. The use of these patterns can greatly improve effectiveness of mining trend and log data, which is performed in many condition monitoring tasks, including monitoring of MI and MR machines and of power plants.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the inventive technique is described herein largely in connection with machine condition monitoring, the technique may be applied to any repository of temporal data, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for identifying patterns in symbolic interval data contained in an interval sequence database $\mathcal{D}$, the method comprising:

in a processor, converting the interval sequence database $\mathcal{D}$ into a semi-interval sequence database $\mathcal{D}'$ comprising a plurality of semi-interval itemsets [I, t], each having a unique timestamp t; and in a processor, identifying closed semi-interval sequence patterns (SISPs) $S_i$ in $\mathcal{D}'$, wherein the closed SISPs contain at least one interval that does not have both start and end points;

wherein converting the interval sequence database $\mathcal{D}$ into a semi-interval sequence database $\mathcal{D}'$ further comprises converting each sequence $I$ of $\mathcal{D}$ to a semi-interval sequence $I'$ by initially determining all semi-intervals S in the interval sequence database $\mathcal{D}$ as S={[$\sigma^+$,s],[$\sigma^-$, e]|[$\sigma$,s, e]∈I}, where $\sigma^+$, $\sigma^-$ represent the start and end of a symbolic interval with symbol $\sigma$, and s and e are start and end times of an interval.

2. The method of claim 1, wherein converting each sequence $I$ of $\mathcal{D}$ to a semi-interval sequence $I'$ further comprises:

determining all unique time stamps T in the sequence database $\mathcal{D}$ as T={s,e|[$\sigma$,s,e]∈D}; and determining the semi-interval sequence $I'$ as I'={[Σ,t] |σ∈Σ ⇔ [σ,t]∈T};

wherein Σ is an alphabet containing a set of unique symbols.

3. The method of claim 1, wherein identifying SISPs $S_i$ in $\mathcal{D}'$ uses a closed sequential pattern mining algorithm identifying only those SISPs having support in the semi-interval sequence database $\mathcal{D}'$ greater than or equal to a threshold α.

4. The method of claim 1, further comprising:
identifying closed groups of SISPs among the SISPs $S_i$.

5. The method of claim 4, wherein identifying closed groups of SISPs among the SISPs $S_i$ uses a closed itemset mining algorithm identifying only those groups of SISPs having support in the semi-interval sequence database $\mathcal{D}'$ greater than or equal to a threshold α.

6. The method of claim 4, further comprising:
merging each closed group of SISPs into a graph, wherein individual itemsets are represented by nodes in the graph and precedence relations are represented by edges, the graph representing a closed SIPO.

7. The method of claim 1, wherein the interval sequence database $\mathcal{D}$ additionally contains representations of instantaneous events, and the instantaneous events are included in the plurality of semi-interval itemsets [I, t].

8. The method of claim 1, wherein the interval sequence database $\mathcal{D}$ is a database containing computer log files.

9. The method of claim 1, wherein the interval sequence database $\mathcal{D}$ is a database containing sensor data.

10. The method of claim 1, wherein the interval sequence database $\mathcal{D}$ is a database containing power plant operation data.

11. The method of claim 1, wherein the interval sequence database $\mathcal{D}$ is a database containing medical machinery operation data.

12. The method of claim 1, wherein the symbolic interval data contained in the interval sequence database $\mathcal{D}$ is at least partly derived from at least one of numeric interval data and numeric instantaneous data.

13. The method of claim 1, further comprising:
finding predictive patterns in the data using the SISPs $S_i$.

14. The method of claim 1, further comprising:
identifying anomalous behavior using a baseline established from the SISPs $S_i$.

15. A non-transitory computer-usable medium having computer readable instructions stored thereon for execution by a processor to perform a method for identifying patterns in symbolic interval data contained in an interval sequence database $\mathcal{D}$, the method comprising:

converting the interval sequence database $\mathcal{D}$ into a semi-interval sequence database $\mathcal{D}'$ comprising a plurality of semi-interval itemsets [I, t], each having a unique timestamp t; and identifying closed semi-interval sequence patterns (SISPs) $S_i$ in $\mathcal{D}'$, wherein the closed SISPs contain at least one interval that does not have both start and end points;

wherein converting the interval sequence database $\mathcal{D}$ into a semi-interval sequence database $\mathcal{D}'$ further comprises converting each sequence $I$ of $\mathcal{D}$ to a semi-interval sequence $I'$ by initially determining all semi-intervals S in the interval sequence database $\mathcal{D}$ as S={[σ⁺,s],[σ⁻,e]|[σ,s, e]∈I} where σ⁺,σ⁻ represent the start and end of a symbolic interval with symbol σ, and s and e are start and end times of an interval.

16. The non-transitory computer-useable medium of claim 15, wherein converting each sequence $I$ of $\mathcal{D}$ to a semi-interval sequence $I'$ further comprises:
determining all unique time stamps T in the sequence database $\mathcal{D}$ as T={s,e|[σ,s, e]∈D}; and
determining the semi-interval sequence I' as I'={[Σ,t]|σ∈ Σ⇔[σ,t]∈T};
wherein Σ is an alphabet containing a set of unique symbols.

17. The non-transitory computer-usable medium of claim 15, wherein identifying SISPs $S_i$ in $\mathcal{D}'$ uses a closed sequential pattern mining algorithm identifying only those SISPs having support in the semi-interval sequence database $\mathcal{D}'$ greater than or equal to a threshold α.

18. The non-transitory computer-usable medium of claim 15, wherein the method further comprises:
identifying closed groups of SISPs among the SISPs $S_i$.

19. The non-transitory computer-usable medium of claim 18, wherein identifying closed groups of SISPs among the SISPs $S_i$ uses a closed itemset mining algorithm identifying only those groups of SISPs having support in the semi-interval sequence database $\mathcal{D}'$ greater than or equal to a threshold α.

20. The non-transitory computer-usable medium of claim 18, wherein the method further comprises:
merging each closed group of SISPs into a graph, wherein individual itemsets are represented by nodes in the graph and precedence relations are represented by edges, the graph representing a closed SIPO.

21. The non-transitory computer-usable medium of claim 15, wherein the interval sequence database $\mathcal{D}$ additionally contains representations of instantaneous events, and the instantaneous events are included in the plurality of semi-interval itemsets [I, t].

22. The non-transitory computer-usable medium of claim 15, wherein the interval sequence database $\mathcal{D}$ is a database containing computer log files.

23. The non-transitory computer-usable medium of claim 15, wherein the interval sequence database $\mathcal{D}$ is a database containing sensor data.

24. The non-transitory computer-usable medium of claim 15, wherein the interval sequence database $\mathcal{D}$ is a database containing power plant operation data.

25. The non-transitory computer-usable medium of claim 15, wherein the interval sequence database $\mathcal{D}$ is a database containing medical machinery operation data.

26. The non-transitory computer-usable medium of claim 15, wherein the symbolic interval data contained in the interval sequence database $\mathcal{D}$ is at least partly derived from at least one of numeric interval data and numeric instantaneous data.

27. The non-transitory computer-usable medium of claim 15, wherein the method further comprises:
finding predictive patterns in the data using the SISPs $S_i$.

28. The non-transitory computer-usable medium of claim 15, wherein the method further comprises:
identifying anomalous behavior using a baseline established from the SISPs $S_i$.

* * * * *